(12) United States Patent
Erpelding

(10) Patent No.: US 7,046,483 B2
(45) Date of Patent: May 16, 2006

(54) COPPER GIMBAL AND GIMBAL DAMPING FOR INTEGRATED LEAD SUSPENSION

(75) Inventor: A. David Erpelding, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 253 days.

(21) Appl. No.: 10/157,399

(22) Filed: May 28, 2002

(65) Prior Publication Data

US 2003/0223152 A1    Dec. 4, 2003

(51) Int. Cl.
G11B 5/48 (2006.01)
(52) U.S. Cl. .................................................. 360/245.3
(58) Field of Classification Search ............. 360/245.8, 360/245.9, 245.3
See application file for complete search history.

(56) References Cited

U.S. PATENT DOCUMENTS

| | | | |
|---|---|---|---|
| 4,543,295 A | 9/1985 | St. Clair et al. | |
| 5,124,864 A * | 6/1992 | Matsuzaki | ............... 360/244.4 |
| 5,353,181 A | 10/1994 | Frater et al. | |
| 5,427,848 A | 6/1995 | Baer et al. | |
| 5,490,027 A | 2/1996 | Hamilton et al. | |
| 5,557,488 A | 9/1996 | Hamilton et al. | |
| 5,594,607 A | 1/1997 | Erpelding et al. | |
| 5,606,477 A | 2/1997 | Erpelding et al. | |
| 5,724,211 A * | 3/1998 | Higashiya et al. | ....... 360/244.4 |
| 5,835,306 A | 11/1998 | Bennin | |
| 5,862,010 A | 1/1999 | Simmons et al. | |
| 5,896,246 A * | 4/1999 | Budde et al. | ............ 360/244.4 |
| 5,896,247 A | 4/1999 | Pan et al. | |
| 5,929,326 A | 7/1999 | Imaino et al. | |
| 5,933,293 A | 8/1999 | Bennin | |
| 5,982,584 A | 11/1999 | Bennin et al. | |
| 5,986,853 A | 11/1999 | Simmons et al. | |
| 6,055,132 A | 4/2000 | Arya et al. | |
| 6,067,209 A | 5/2000 | Aoyagi et al. | |
| 6,072,664 A | 6/2000 | Aoyagi et al. | |
| 6,282,064 B1 | 8/2001 | Palmer et al. | |
| 6,381,100 B1 * | 4/2002 | Bennin et al. | ........... 360/245.9 |
| 6,414,820 B1 * | 7/2002 | Coon et al. | ............... 360/245.9 |
| 2002/0186508 A1 * | 12/2002 | Kube et al. | ............... 360/245.9 |
| 2003/0007292 A1 * | 1/2003 | Himes et al. | ............. 360/245.9 |

OTHER PUBLICATIONS

U.S. Appl. No. 10/137,145, filed May 1, 2002, entitled "Integrated Lead Suspension for Use in a Disk Drive Using a Tri-Metal Laminate and Method for Fabrication", invented by A. D. Erpelding and K.B. Klaassen.

* cited by examiner

Primary Examiner—A. J. Heinz
Assistant Examiner—Mark Blouin
(74) Attorney, Agent, or Firm—Alan S. Raynes; Konrad Raynes & Victor, LLP

(57) ABSTRACT

Flexure leg designs for a gimbal structure in an integrated lead suspension (ILS) in a disk drive system are disclosed. In one design, the flexure leg may include a first conducting layer comprising copper, a second conducting layer comprising copper, and a dielectric layer comprising a polymer disposed between the first conducting layer and the second conducting layer. In one aspect, the first conducting layer and the dielectric layer may include a channel extending therethrough. The channel separates the first conducting layer and the dielectric layer into two regions separated from each other by the channel. The channel does not extend through the second conducting layer. In another aspect, the gimbal structure may include a dimple structure separated from a slider by layers of copper and polyimide, with the polyimide layer being formed in direct contact with the dimple structure.

6 Claims, 5 Drawing Sheets

COPPER GIMBAL AND GIMBAL DAMPING FOR INTEGRATED LEAD SUSPENSION

FIELD OF THE INVENTION

Embodiments of the present invention relate generally to integrated lead suspension structures in disk drive systems, and more particularly, to gimbal structures and methods for manufacturing the same.

DESCRIPTION OF RELATED ART

Magnetic storage systems typically include a rotatable magnetic disk having concentric data tracks defined for storing data, and a magnetic recording head or transducer for reading data from and writing data to the various data tracks. In typical disk drive systems, a stack of one or more magnetic disks is mounted over a spindle on a drive motor. The system also typically includes an actuator for moving the magnetic recording head relative to the disk surfaces, and electronic circuitry for processing signals to implement various functions of the disk drive.

The head is typically attached to a carrier or slider having an air bearing surface which is supported during operation adjacent to the data surface of the disk by a cushion of air generated by the rotating disk. The terms "head" and "slider" are sometimes both used to refer to the slider having a head attached thereon. The head is typically mounted on a gimbal that makes up at least part of a suspension assembly that connects the head to the actuator.

U.S. Pat. Nos. 5,986,853 and 5,862,010 describe transducer integrated lead suspension (ILS) systems including a multi-layered laminate structure, and are hereby incorporated by reference in their entirety. One example of a preferred laminated structure described in the '853 and '010 patents includes a gimbal structure including flexure legs of stainless steel on which alternating layers of copper and polyimide are formed.

An example of a portion of a conventional integrated lead suspension assembly, including a slider 214 positioned on a gimbal structure 201, is illustrated in FIG. 1. The suspension includes ILS steel portion 222 with flexure legs 220 extending therefrom. The flexure arms are formed by etching the ILS steel layer to form the flexure leg structure 220. The slider 214 is positioned between the flexure legs 220 and includes an air bearing surface (the slider 214 surface shown in FIG. 1) and a backside surface (not shown) on the opposite side of the slider 214. The slider may include a transducer 216 that reads and writes information to and from a disk positioned adjacent to the air bearing surface. The slider 214 is positioned on tongue 226. A limiter 228 is connected to the tongue as known in the art. The tongue 226 and limiter extend from and are formed from the same steel layer used for forming the flexure legs 220. Shear tabs 208 also extend from the flexure legs 220. The suspension assembly also includes a load beam 230, from which end lift tab 210 extends. Conductors 202 extend along the sides of the flexure legs 220 and connect to one end of the slider 214 containing the read/write transducer 216. The conductors carry electrical signals to and from the transducer 216.

Dynamic performance requirements for suspension structures are becoming more demanding as a result of the need for faster data and input/output rates. The requirements for the bending and torsion modes of vibration are increasing towards the values associated with the gimbal modes. These in turn effect track mis-registration (TMR). It is desirable for the dynamic performance of the gimbal and its components, such as the flexure legs 220, to be considered when the overall dynamic performance of a suspension system is designed.

SUMMARY

Certain embodiments of the present invention relate to a design approach for utilizing the existing layers in an integrated lead suspension (ILS) system to act as a gimbal flexure leg structure. Such a design permits the formation of compact, low stiffness and damped flexure legs, and a damped dimple. One design uses a high strength copper alloy for the flexure legs and, in conjunction with a polyimide layer, achieves constrained layer damping of the flexure legs. Additional damping may be achieved by having the dimple of the suspension gimbal system apply its load through the polyimide layer, rather than traditionally through the steel surface of the tongue. This provides damping of the dimple as the slider nutates about the dimple's contact point. Such a design approach can provide improvements in ILS gimbal system dynamics and stiffness.

One embodiment relates to a structure adapted to support a transducer in a disk drive system. The structure includes at least one flexure leg consisting of an electrically conducting path adapted to transmit electrical signals to and from the transducer. The transducer is carried by the at least one flexure leg.

Embodiments also relate to a flexure leg for a suspension assembly in a disk drive system, wherein the flexure leg includes no steel, and wherein the flexure leg consists of a layer of electrically conducting material.

Embodiments also relate to a flexure leg for a suspension assembly in a disk drive system, the flexure leg including a first electrically conducting layer, a second electrically conducting layer, and a dielectric layer comprising a polymer disposed between the first electrically conducting layer and the second electrically conducting layer, wherein the flexure leg includes no steel.

Embodiments also relate to an integrated lead suspension for a disk drive, including a slider positioned on the integrated lead suspension, a layer of polymer material on the integrated lead suspension, and a dimple structure positioned in contact with the layer of polymer material on the integrated lead suspension, wherein the layer of polymer is positioned between the dimple structure and the slider.

Embodiments also relate to a disk drive including at least one disk, a rotatable hub for mounting the disk, a read/write head adapted to read from and write to the disk, and at least one flexure leg adapted to support at least a portion of the head. The flexure leg consists of a single layer of a material other than steel.

Embodiments also relate to a disk drive including at least one disk, a rotatable hub for mounting the disk, a read/write head adapted to read from and write to the disk, and at least one flexure leg adapted to support at least a portion of the head. The flexure leg is formed from materials other than steel, and includes first and second electrically conducting layers and a dielectric material disposed between the first and second electrically conducting layers.

Embodiments also relate to a method for damping a contact between a dimple structure and a slider in an integrated lead suspension, including providing a dimple structure on the integrated lead suspension, forming a polymer layer in direct contact with the dimple structure, and positioning a slider on the integrated lead suspension. The polymer layer is positioned between the slider and the dimple structure.

Embodiments also relate to a method for damping a contact between a dimple structure and a slider in an integrated lead suspension, including providing a dimple structure on the integrated lead suspension, forming a polymer layer in direct contact with the dimple structure, forming a metal layer in direct contact with the polymer layer, and positioning a slider on the metal layer. The dimple structure is separated from the slider by at least the polymer layer and the metal layer.

Embodiments also relate to a method for forming a flexure leg structure from materials other than steel, for use in an integrated lead suspension in a disk drive, including forming a laminated structure comprising a first layer including copper, a second layer including copper, and a polymer layer therebetween. The method also includes forming a channel through the first layer including copper and the polymer layer so that the first layer including copper includes electrically isolated portions separated by the channel and the polymer layer includes spaced apart portions separated by the channel. The channel is formed so that it does not extend through the second layer including copper.

BRIEF DESCRIPTION OF THE DRAWINGS

Embodiments of the invention are described with reference to the accompanying drawings which, for illustrative purposes, are schematic and not necessarily drawn to scale.

DETAILED DESCRIPTION

While the invention is described in terms of the best mode for achieving this invention's objectives, it will be appreciated by those skilled in the art that variations may be accomplished in view of these teachings without deviating from the spirit or scope of the invention.

Figure 2:
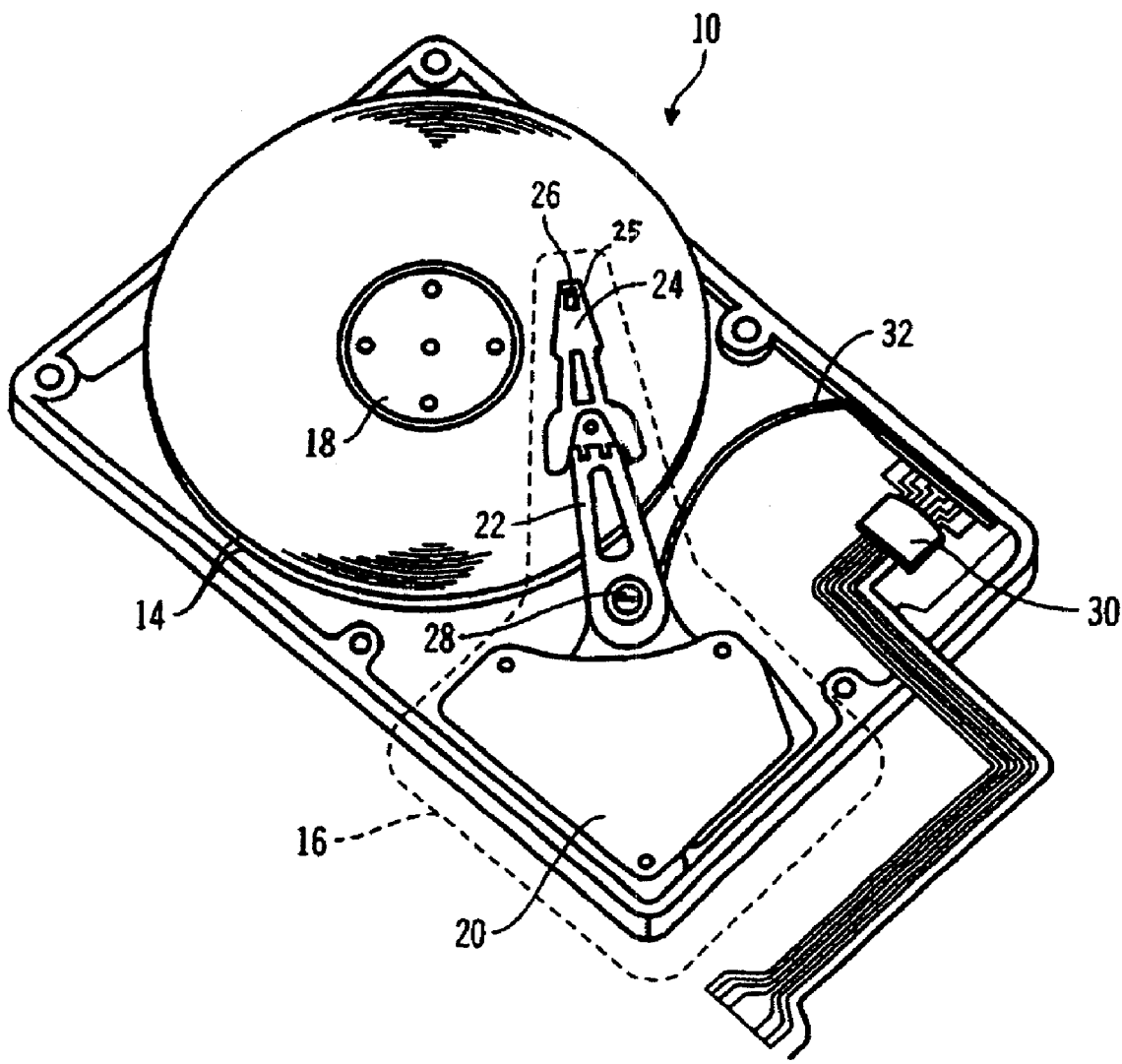
FIG. 2 illustrates a disk drive integrated lead suspension assembly in accordance with an embodiment of the present invention.

Certain embodiments relate to a suspension structure that may be used in disk drive components. FIG. 2 illustrates a top view of a disk drive system in accordance with an embodiment of the present invention. The disk drive system includes one or more disks 14 stacked above one another. The disks 14 may be conventional particulate or thin film recording disks, which are capable of storing digital data in concentric tracks. Both sides of the disks 14 may be available for storage, and the stack may include any number of such disks 14. The disks 14 are mounted to a spindle 18. The spindle 18 is attached to a spindle motor, which rotates the spindle 18 and the disks 14 to provide read/write access to the various portions of the concentric tracks on the disks.

The disk drive system 10 illustrated in FIG. 2 also includes an actuator assembly 16 including voice coil motor assembly 20, which controls a head arm assembly which may include a positioner arm 22 and a suspension 24. The suspension 24 includes a read/write head 26 positioned at its distal end. Although only one read/write head 26 is shown, it will be recognized that the disk drive assembly 10 may include a read/write head for each side of each disk 14 included in the drive. The read/write head may include a transducer such as a magnetorestrictive transducer coupled to a slider. The positioner arm 22 may further include a pivot 28 around which the positioner arm 22 moves.

The disk drive system 10 may further include a read/write chip 30. As is known in the art, the read/write chip 30 cooperates with the read/write heads 26 to read data from and write data to the disks 14. A flexible printed circuit member 32 may be used to carry digital signals between the chip 30 and the actuator assembly 16. One or more electrical paths are routed along the positioner arm 22 and suspension 24 to carry electrical signals to and from the read/write head 26.

The suspension 24 includes a gimbal structure 25 at its distal end on which the read/write head 26 is positioned. The suspension 24 may also include integrated leads (not shown in FIG. 2) for carrying electrical signals to and from the head 26, may have a variety of geometries and configurations, and may be formed from a variety of materials. The term integrated lead suspension (ILS) as used herein refers to a suspension having integrated leads, as opposed to a suspension having separate wires extending to the head. The suspension 24 of FIG. 2 may be formed to include gimbal structures as set forth in various embodiments described below.

Certain embodiments of the present invention relate to structural features of the suspension 24, including the gimbal structure, in an ILS. The gimbal structure typically includes flexure legs which support the structure. It is known to form the flexure legs from the ILS steel (typically stainless steel) routed in parallel with the conducting lines (typically copper conductors). It is also known to route the copper conductors directly on the steel in order to reduce the area of the structure. The copper conductors may be formed as part of a laminate of one or more copper layers and a polyimide layer. The steel of the flexure legs is typically at least 200 μm wider than the conductors. This extra steel is required for two primary reasons. First, etching two different metals (copper and steel) requires a margin of error for compensation due to different etching rates. Second, a photoresist mask, which is used for etching a polyimide layer, is formed to adhere to a ledge of steel. This can be avoided by not having steel in the flexure legs. This reduces the area of the structure and reduces the gimbal stiffness. In addition, when only one type of metal (for example, copper) is used, the etching may be conducted without the use of a photoresist mask, with the copper acting as a mask. Thus, advantages including a decrease in size and the elimination of processing steps are possible in designs that do not utilize the ILS steel in the flexure leg design.

Figure 3:
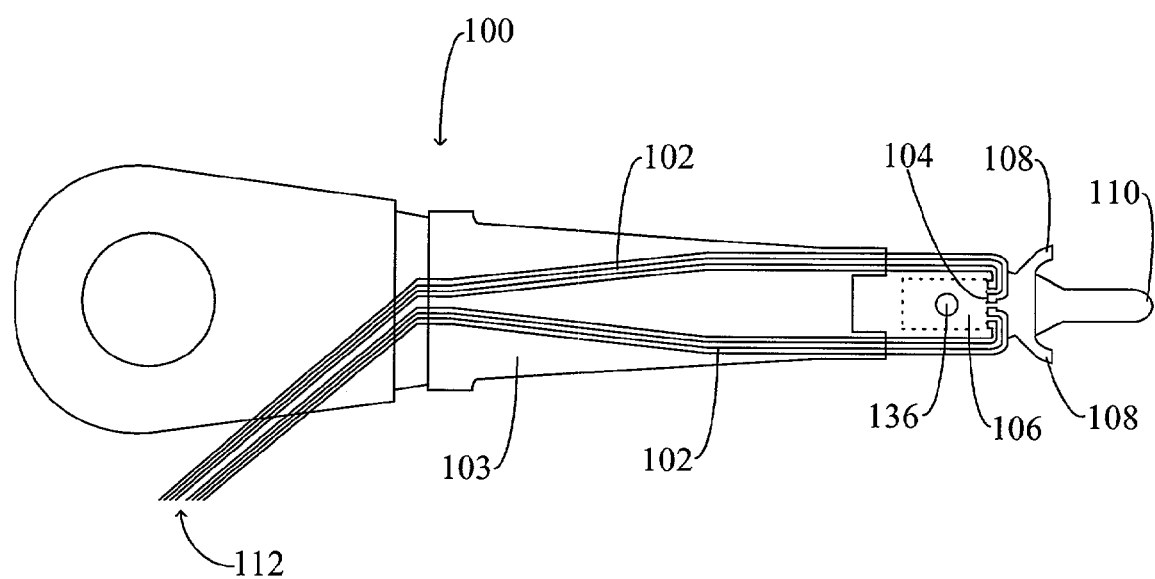
FIG. 3 illustrates portions of an integrated lead suspension in accordance with an embodiment of the present invention.

FIG. 3 illustrates portions of an integrated lead suspension (ILS) of an embodiment of the present invention. Copper conductors 102 extend from an output termination end 112 over ILS steel portion 103 towards the sensor termination end at pad locations 104 at one end of the slider position 106

(in dashed lines). A variety of connection techniques are possible for connecting the conductors to a device at the output termination end 112 and to the read/write head at the slider position 106. Such techniques include, but are not limited to, ultrasonic bonding, solder ball placement and reflow, gold ball bonding, gold wire stitching, and solder wire bonding.

A portion of the copper conductors 102 acts as flexure legs for supporting various structures in the gimbal region. For example, FIG. 3 shows shear tabs 108 which are formed from the same metal layer as the ILS steel portion 103 (but separated therefrom) and which are held in position by the copper conductors 102. The copper conductors 102 are positioned to extend along the ILS steel portion 103 and along a portion of the sheer tabs 108. In addition, the copper conductors 102 are laminated to both the ILS steel portion 103 and to the sheer tabs 108. Thus, the ILS steel portion 103 and the shear tabs 108, while separated from one another, are both coupled to the copper conductors 102.

Figure 4:
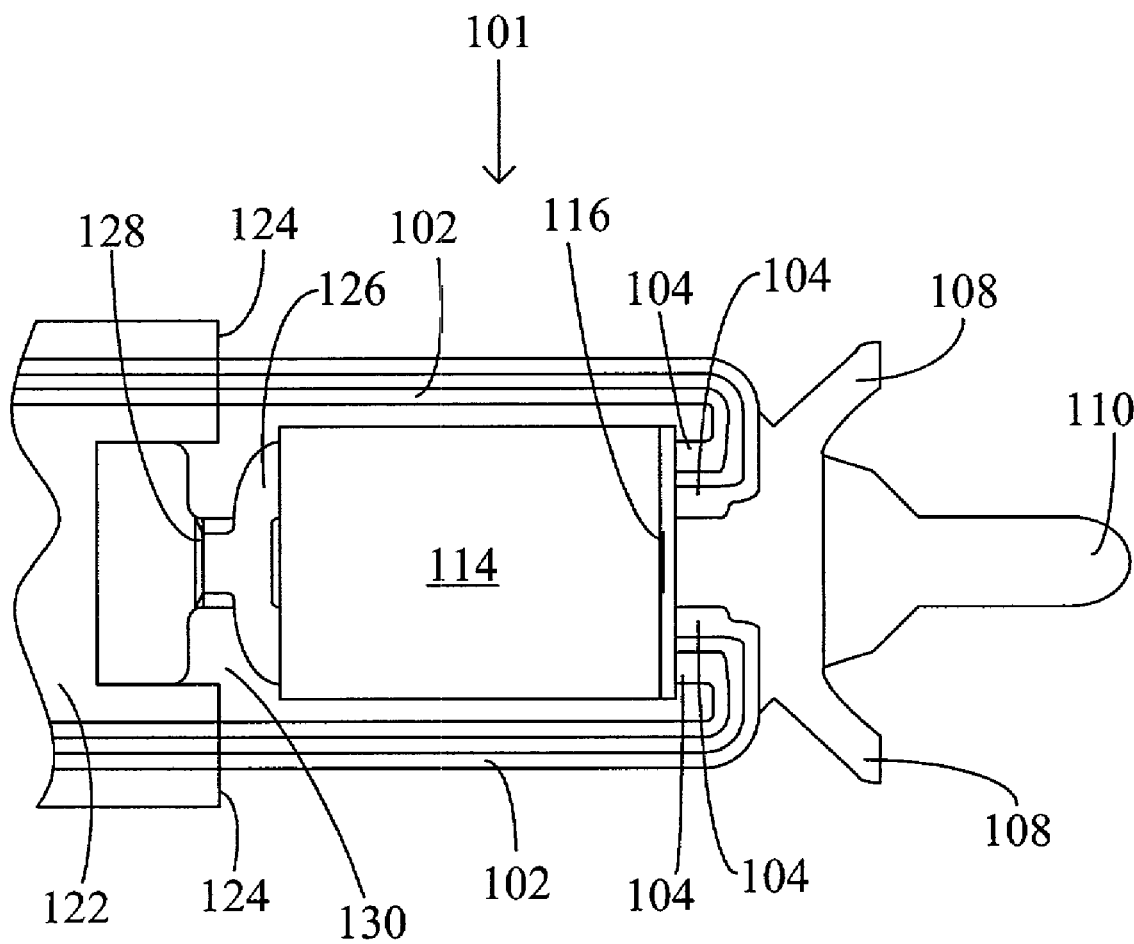
FIG. 4 illustrates a portion of an integrated suspension assembly including a gimbal structure having a slider situated thereon in accordance with an embodiment of the present invention.

FIG. 4 illustrates a more detailed view of a portion of an ILS that is similar to that of FIG. 3 and further shows a slider 114 including read/write head 116 positioned on the gimbal structure.

Figure 1:
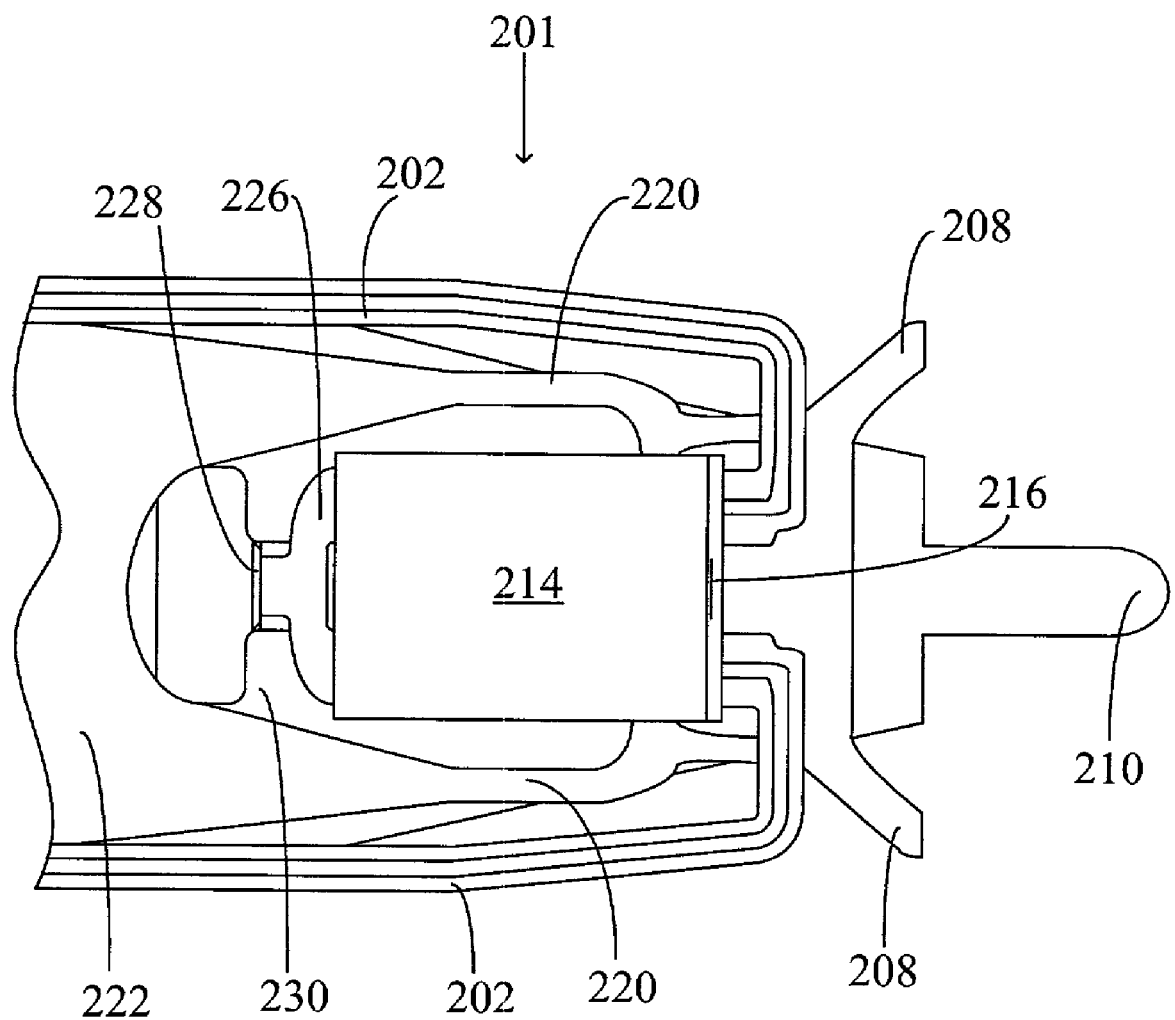
FIG. 1 illustrates a portion of a suspension assembly including a gimbal and having a slider situated thereon in accordance with a conventional integrated lead suspension structure.

FIG. 4 also shows the routing of the flexure legs of the gimbal structure 101. The portion of the copper conductors 102 extending from the ILS steel surface 124 towards the bonding pad region 104 acts as the flexure legs in the gimbal structure. As described in the related art section, FIG. 1 illustrates a conventional suspension and gimbal structure in a view similar to that of FIG. 4. However, FIG. 1 includes steel flexure legs 220 that are not present in FIG. 4. The steel flexure legs extend from ILS steel structure 222 as illustrated in FIG. 1. FIG. 4, on the other hand, shows ILS steel structure 122 ending at surfaces 124. The portion of the copper conductors 102 extending from the ILS steel surface 124 to the bonding pad areas 104 defines the length of the flexure legs for the gimbal structure of FIG. 4.

The flexure legs (copper conductors 102) of the embodiment shown in FIG. 4 are aligned more closely to the sides of the slider body 114 than the flexure legs 220 of the conventional structure shown in FIG. 1. There are a variety of advantages from having the flexure legs closer to the slider body. First, the head can be accessed closer to the disk hub without interference, which allows more data to be stored at the disk inner diameter region. Second, the mass of the flexure legs is less and is positioned closer to the suspension axis, which facilitates high torsion modes, which leads towards better seek/settle time and input/output performance. Third, the conductors are located closer to the slider, which decreases the width of the structure.

In the embodiment shown in FIG. 4, a high strength copper is preferably used for the conductors, because the conductors 102 act as the flexure legs. An example of such a high strength copper is a copper alloy known as C7025 copper alloy. As will be described later in conjunction with FIGS. 5 and 6, the copper conductors 102 used as the flexure legs may in certain embodiments be formed as part of a laminate structure including two layers of copper with a layer of dielectric material such as a polyimide therebetween. In alternative embodiments, one or more conducting layers may be present and the dielectric (for example, polyimide) may be omitted.

The flexure legs 102 of FIG. 4 act to support a number of structures including the shear tabs 108, the tongue 126 on which the slider 114 is mounted, and the limiter 128. These structures may all be formed from the same material as the ILS steel portion 122 (although separate therefrom), and are supported by the flexure legs 102 by being laminated thereto. For example, the flexure legs 102 extend along the ILS steel portion 122 and are laminated thereto. The limiter 128 is attached to the tongue 126, which is attached to the shear tabs 108, which are laminated to the flexure legs 102. Thus, the flexure legs 102 act to support the various structures formed from the same material as the ILS steel portion 122.

FIG. 4 also illustrates a load beam 130, which is a separate structure positioned below and not supported by the flexure legs 102. End tab 110 also extends from the load beam 130.

Figure 5:
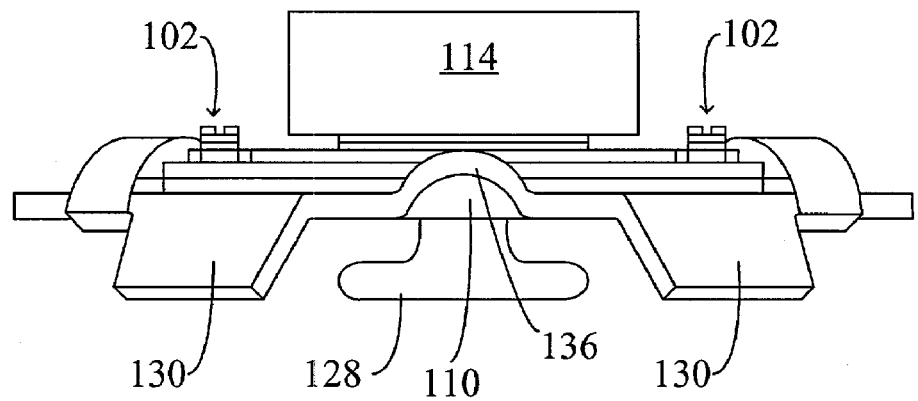
FIG. 5 illustrates an end view of an integrated lead suspension assembly including portions of the gimbal structure in accordance with an embodiment of the present invention.
Figure 6:
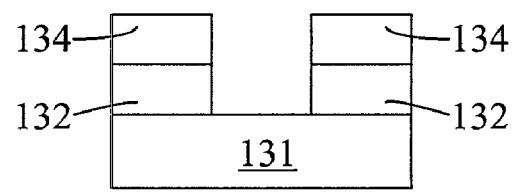
FIG. 6 illustrates in cross-section a conducting line and flexure leg portion of the gimbal structure of FIG. 5.

Certain embodiments also relate to improving the damping effects in the gimbal structure. FIG. 5 illustrates an end view showing portions of the ILS and gimbal structure having a slider positioned thereon. FIG. 6 illustrates in cross-section a conducting line and flexure leg portion of the structure. The conducting line and flexure leg 102 may in certain embodiments be formed as part of a laminated multilayer structure including a lower copper layer 131, an intermediate polyimide layer 132, and an upper copper layer 134, as illustrated in FIG. 5. Any type of process including standard lamination processes as known in the art may be used to adhere the polyimide layer and the second copper layer to the first copper layer. Such processes are described, for example, in U.S. Pat. Nos. 4,543,295 and 5,427,848, each of which is hereby incorporated by reference in its entirety. In one process a dielectric material such as a polyimide and thin sheets of copper, designated as C7025 copper alloy, are used. Heat and pressure are applied to couple the polyimide and one copper sheet to the other copper sheet. The copper layers, when deposited by a plating or vacuum process, may be formed to a thickness of, for example, about 1500 Angstroms or greater. The composition of each of the copper layers may vary, depending on factors such as, for example, the desired conductivity, the mechanical properties, and the processing methods used. The multilayer material structure enables a variety of designs to be implemented, for example, with a ground plane under conducting lines, or with stacked conducting lines. Stacked conductors or a ground plane are methods for making the structure less sensitive to the skin effect. The skin effect causes undesirable high frequency signal loses which in turn increase the rise and fall time of the signal. Stacked conductors or a ground plane may also provide shielding from electromagnetic (EM) noise, for improving data flow rate.

In another aspect of certain embodiments, the layer of polyimide may provide damping effects when constrained by rigid regions of metal. As shown in FIG. 6, the layers 131 and 134 act as constraining layers and the polyimide layer 132 acts as a visco-elastic damping layer. With this configuration, strain energy is imparted to the polyimide layer and may be dissipated during bending or torsion of the flexure legs. The configuration of FIG. 6 also includes the upper layer 134 being two separate conductors separated by a channel or gap. This structure acts to shift the neutral axis of bending off the axis of symmetry of the polyimide layer. This imparts more strain energy into the polyimide as compared to a cross-section that is symmetric on all axes (such as a structure with no gap in the upper layer or polyimide layer). The channel structure also reduces the stiffness of the flexure leg as compared to not having the channel. This effect, together with the flexure leg dimensions, makes it possible to groom the gimbal stiffness for meeting desired pitch stiffness requirements of the slider air bearing surface (ABS).

It should be noted that while the embodiment illustrated in FIGS. 5 and 6 includes two layers of copper with a layer of polyimide therebetween, other embodiments may utilize a single layer of copper together with a layer of polyimide. Still other embodiments may omit the polyimide layer.

Figure 7:
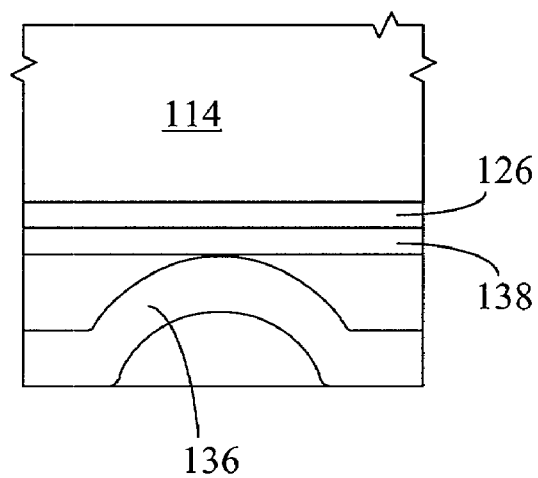
FIG. 7 illustrates a dimple formed under a portion of a slider and separated from the slider by layers of polyimide and copper in accordance with an embodiment of the present invention.

As illustrated in FIGS. 5 and 7, the structure may also include a dimple 136 formed on a portion of the load beam that extends under a portion of the slider 114. FIG. 7 shows that the dimple is in contact with layer 138, which may be a polyimide layer. The tongue layer 126, is located between the polyimide of layer 138 and the slider 114. At least one of the layers 138 and 126 may in certain embodiments be formed from the same layers as used for forming the wiring lines 102. In one such embodiment, the tongue layer 126 may be formed from the same material as copper layer 131 (FIG. 6). In such embodiment, the layer 138 is a different polyimide layer than that used to form layer 132 (FIG. 6). Alternatively, the layer 138 may be the same polyimide layer as layer 132 and the layer 126 may be formed from the same copper layer as used to form layer 134 (FIG. 6). In addition, the tongue layer 126 may be eliminated and slider 114 mounted directly to any one polyimide layer.

The elastic modulus of polyimide is about 50 times less than that of stainless steel, and the polyimide is a lossy material in comparison to stainless steel. The polyimide provides damping to the dimple as it nutates on the polyimide surface. The polyimide, being a somewhat resilient material, will slightly conform to the dimple. This will cause resistance to any in-plane motion of the slider in relation to the dimple.

It will, of course, be understood that modifications of the present invention, in its various aspects, will be apparent to those skilled in the art. Additional embodiments are possible, their specific features depending upon the particular application. For example, a variety of processes may be used for forming the various layers of the structure and for connecting the various layers of the structure, including, but not limited to, plating, chemical vapor deposition, sputtering, and applying heat and/or pressure to connect preformed layers to one another. In addition, embodiments may be applicable to a variety of suspension structures. In addition, while certain embodiments utilize layers of copper (including copper alloys) and polyimide, other conducting materials (for example, other metals) and dielectric materials (for example, other polymers) may be utilized.

What is claimed:

1. A flexure leg for a suspension assembly in a disk drive system, the flexure leg comprising:
    a first electrically conducting layer;
    a second electrically conducting layer; and
    a dielectric layer disposed between the first electrically conducting layer and the second electrically conducting layer;
    wherein the flexure leg includes no steel;
    wherein the first electrically conducting layer includes a channel extending therethrough, wherein the channel does not extend through the second electrically conducting layer, and wherein the channel separates the first electrically conducting layer into two regions separated from each other by the channel; and
    wherein the channel extends through the dielectric material and separates the dielectric material into two regions separated from each other by the channel.

2. A flexure leg as in claim 1, wherein the material of the first and second electrically conducting layers comprises copper.

3. A flexure leg as in claim 1, wherein the dielectric material is a polymeric material.

4. A flexure leg as in claim 3, wherein the polymeric material is polyimide.

5. A flexure leg as in claim 1, wherein the flexure leg consists of the first electrically conducting layer, the second electrically conducting layer, and the dielectric layer, wherein the first and second electrically conducting layers are each formed from a material comprising copper.

6. A flexure leg as in claim 1, wherein the flexure leg includes two electrically conducting layers and two dielectric layers, wherein the layers alternate between electrically conducting and dielectric.

* * * * *